US009443177B2

(12) United States Patent
Bosell et al.

(10) Patent No.: US 9,443,177 B2
(45) Date of Patent: Sep. 13, 2016

(54) UNIVERSAL PRINTING CONTROLLER (75) Inventors: Bjorn Bosell, Angered (SE); Bjorn Eriksson, Gothenburg (SE); Thomas Klein, Trollhattan (SE); Isak Styf, Gothenburg (SE)

(73) Assignee: MARKEM-IMAJE, Valence (FR)

( * ) Notice: Subject to any disclaimer, the term of this patent is extended or adjusted under 35 U.S.C. 154(b) by 0 days.

(21) Appl. No.: 14/129,566

(22) PCT Filed: Jun. 29, 2012

(86) PCT No.: PCT/IB2012/001626
§ 371 (c)(1),
(2), (4) Date: Feb. 21, 2014

(87) PCT Pub. No.: WO2013/001366
PCT Pub. Date: Jan. 3, 2013

(65) Prior Publication Data
US 2014/0198324 A1  Jul. 17, 2014

Related U.S. Application Data (60) Provisional application No. 61/502,359, filed on Jun. 29, 2011.

(51) Int. Cl.
*G06K 15/00* (2006.01)
*G06K 15/02* (2006.01)
*G06F 3/12* (2006.01)

(52) U.S. Cl.
CPC ............... *G06K 15/40* (2013.01); *G06F 3/122* (2013.01); *G06F 3/1247* (2013.01);
(Continued)

(58) Field of Classification Search
CPC .... B41J 2/04586; B41J 2202/19; G06F 3/1204
USPC ............ 358/1.15, 1.8, 1.9; 347/5, 12, 20, 50
See application file for complete search history.

(56) References Cited

U.S. PATENT DOCUMENTS

| 6,116,716 A | * | 9/2000 | Tajika et al. ..................... 347/19 |
| 2002/0030848 A1 | * | 3/2002 | Moriyama ............ G06F 3/1204 358/1.15 |

(Continued)

FOREIGN PATENT DOCUMENTS

| CN | 101052943 A | 10/2007 |
| EP | 0 692 769 A2 | 1/1996 |
| EP | 1293341 A2 | 3/2003 |

OTHER PUBLICATIONS

International Search Report, corresponding to PCT/IB2012/001626, mailed Dec. 7, 2012.
(Continued)

*Primary Examiner* — Jacky X Zheng
(74) *Attorney, Agent, or Firm* — Renner, Otto, Boisselle and Sklar, LLP (57) ABSTRACT

Example embodiments presented herein are directed towards a universal printing controller, and corresponding method, for universal printing control. A universal printing controller is presented herein which may provide instructions and/or control functionality to printers of various print technologies. Based on a particular print-head type, the universal controller may choose a print technology format from a variety of different print technology formats. The universal printing controller may also provide print instructions for printing an image description based on the chosen print technology format.

22 Claims, 4 Drawing Sheets (52) U.S. Cl.
CPC .......... *G06F 3/1282* (2013.01); *G06K 15/00* (2013.01); *G06K 15/1806* (2013.01); *G06K 15/1825* (2013.01); *G06F 3/1232* (2013.01); *G06F 3/1281* (2013.01); *G06F 3/1288* (2013.01)

(56) References Cited

U.S. PATENT DOCUMENTS

| | | | |
|---|---|---|---|
| 2002/0122204 A1* | 9/2002 | Van Der Meijs | 358/1.15 |
| 2006/0092437 A1* | 5/2006 | Martin | 358/1.8 |
| 2006/0187251 A1* | 8/2006 | Pulver et al. | 347/13 |
| 2006/0216043 A1* | 9/2006 | Evans | B41J 3/546 399/6 |
| 2014/0225944 A1* | 8/2014 | Larsson | G06F 3/1204 347/5 |

OTHER PUBLICATIONS

International Preliminary Report on Patentability, corresponding to PCT/IB2011/001626, mailed Oct. 11, 2013.

English translation of Office Action in corresponding Chinese Patent Application No. 201280032125.1 dated Sep. 25, 2015.

\* cited by examiner

UNIVERSAL PRINTING CONTROLLER

TECHNICAL FIELD

The example embodiments presented herein are directed towards a system, and corresponding method, for universal printing control.

BACKGROUND

In an industrial printing environment, numerous printers are typically configured to simultaneously print information on various types of items. One example of an industrial printing environment may be the printing of labels on various types of packages or consumer goods. Consumer goods require a great deal of product identification (e.g., expiry dates, traceability data, etc.). The information to be printed may vary from one item to another, from one batch of similar items to another, from one site or time of manufacture to another, and/or from one type of print technology to another.

Each printing technology typically has two basic components, a print-head and a corresponding controller. The controller can be situated locally, or close to the print-head. The controller may also be remotely situated. Remote controllers may be shared or used to control several print-heads.

SUMMARY

The print, image, and/or formatting specifications may differ with different forms of print technologies. Thus, as different print-head technologies differ, controllers must output different data formats. For example, laser print-heads receive vector data, whereas Thermal Transfer Overprinting (TTO) and Drop On Demand (DOD) printers receive bitmap data. Typically, in industrial printing environments, either a single type of printer is employed or multiple types of printers may be employed. In the case that multiple types of printers are employed, separate means of printing control is typically utilized for each distinct printing type. The use of separate printing controllers introduces complications and increased costs to an industrial printing environment. A need exists for a single controller which is capable of providing control to various print-heads of different printing technologies. Thus, at least one example object of some of the example embodiments presented herein may be to improve methods of printing control for industrial printing environments utilizing various types of printing technologies.

Some example embodiments may be directed towards a method for universal printing control. The method may comprise determining a print-head type configuration. The method may also comprise choosing a print technology format from a variety of different print technology formats based on the print-head configuration. The method may also comprise transmitting print instructions for printing an image description based on the chosen print technology format.

Some example embodiments may also comprise determining the print-head type configuration by receiving a print-head identification from a connecting print-head.

Some example embodiments may also comprise determining the print-head type configuration by receiving a print-head identification from a designated head connector.

Some example embodiments may also comprise determining the print-head type configuration by receiving a voltage reading associated with a print-head connection, and determining the print-head type configuration based on a value of the voltage reading.

Some example embodiments may also comprise determining the print-head type configuration by receiving a print-head identification from a user-provided source.

Some example embodiments may also comprise choosing the print technology format by receiving the print technology format from a connecting print-head.

Some example embodiments may also comprise choosing the print technology format by retrieving the print technology format from a format source, where the retrieve may be based on the print-head type configuration.

Some example embodiments may also comprise the format source being a format database.

Some example embodiments may also comprise the format database being a specific database associated with a specific print-head type.

Some example embodiments may also comprise the format source being a user-provided source.

Some example embodiments may also comprise the variety of different print-head type configurations being at least one of a vector, raster, and/or RFID type of print technology.

Some example embodiments may also comprise the print technology format being print imaging parameters and/or print technology specific parameters.

Some example embodiments may also comprise the steps of determining, choosing, and transmitting occurring simultaneously for different print-head types.

Some example embodiments may be directed towards a universal printing controller. The universal printing controller may comprise a print-head manager that may determine a print-head type configuration. The controller may also comprise a print format unit that may choose a print technology format from a variety of different print technology formats. The controller may further comprise a communications port that may transmit printing instructions for printing an image description based on the chosen print technology format.

Some example embodiments may also comprise the controller being configured to perform any of the method steps described above.

Some example embodiments may also be directed towards a computer-readable storage medium encoded with computer executable instructions, wherein the instructions, when executed by a universal printing controller, may perform any of the method steps described above.

At least one example advantage of some of the above example embodiments may be the reduction of complexity and costs associated with printing environments that utilize various types of printing technologies.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

Some example embodiments presented herein are directed towards a system, and corresponding method, for providing universal printing control in an industrial printing setting. Such a system may reduce the complexity and costs of traditional industrial printing environments by providing a single means for controlling printing for various forms of print technologies.

Figure 1:
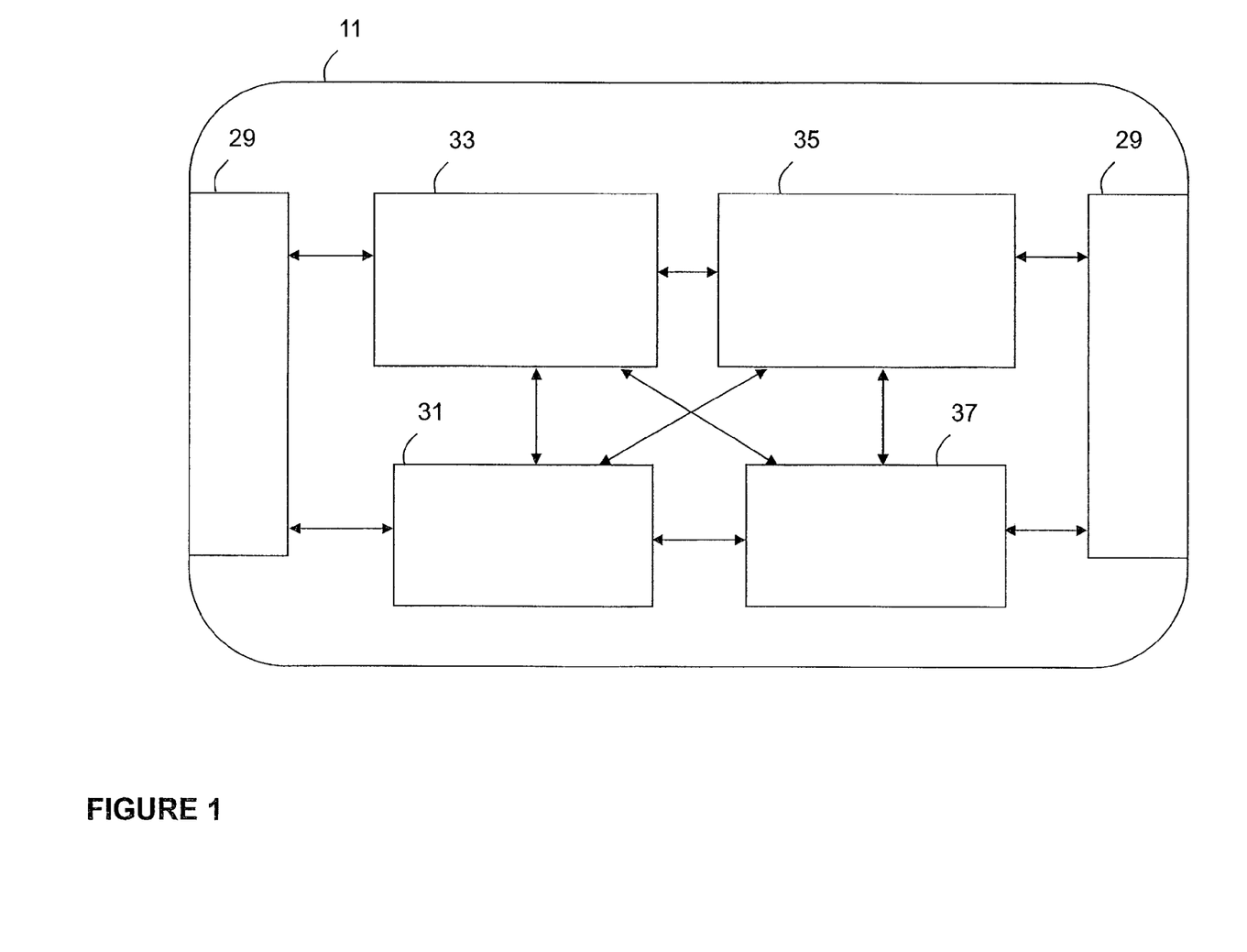
FIG. 1 is a schematic representation of a universal printing controller, according to some of the example embodiments.

FIG. 1 illustrates a simplified example of a universal print controller 11, according to some of the example embodiments. The universal print controller 11 of FIG. 1 comprises two communication ports 29, however it should be appreciated that the controller 11 may comprise any number of communication ports 29 that may be able to transmit or receive any number or type of signals, data, and/or instructions. It should be appreciated that the controller 11 may alternatively comprise a single transceiver port. It should further be appreciated that the communication ports 29 or transceiver port may be in the form of any input/output communications port known in the art.

The controller 11 of FIG. 1 also comprises at least one memory unit 31. The memory unit 31 may be configured to store received, transmitted, and/or measured data and/or executable program instructions. The memory unit 31 may be any suitable type of computer readable memory and may be of volatile and/or non-volatile type.

The controller 11 furthers comprise a general processing unit 33. The controller 11 also comprises a print-head manager 35. The print-head manager 35 may be configured to detect communication with a connected print-head. Print-heads from printers of various printing technologies may be connected to the controller via a connection port.

It should be appreciated that the general processing unit 33 and print-head manager 35 need not be comprised as separate units. Furthermore the general processing unit 33 and the print-head manager 35 may be any suitable type of computation unit, e.g. a microprocessor, digital signal processor (DSP), field programmable gate array (FPGA), or application specific integrated circuit (ASIC).

Figure 2A:
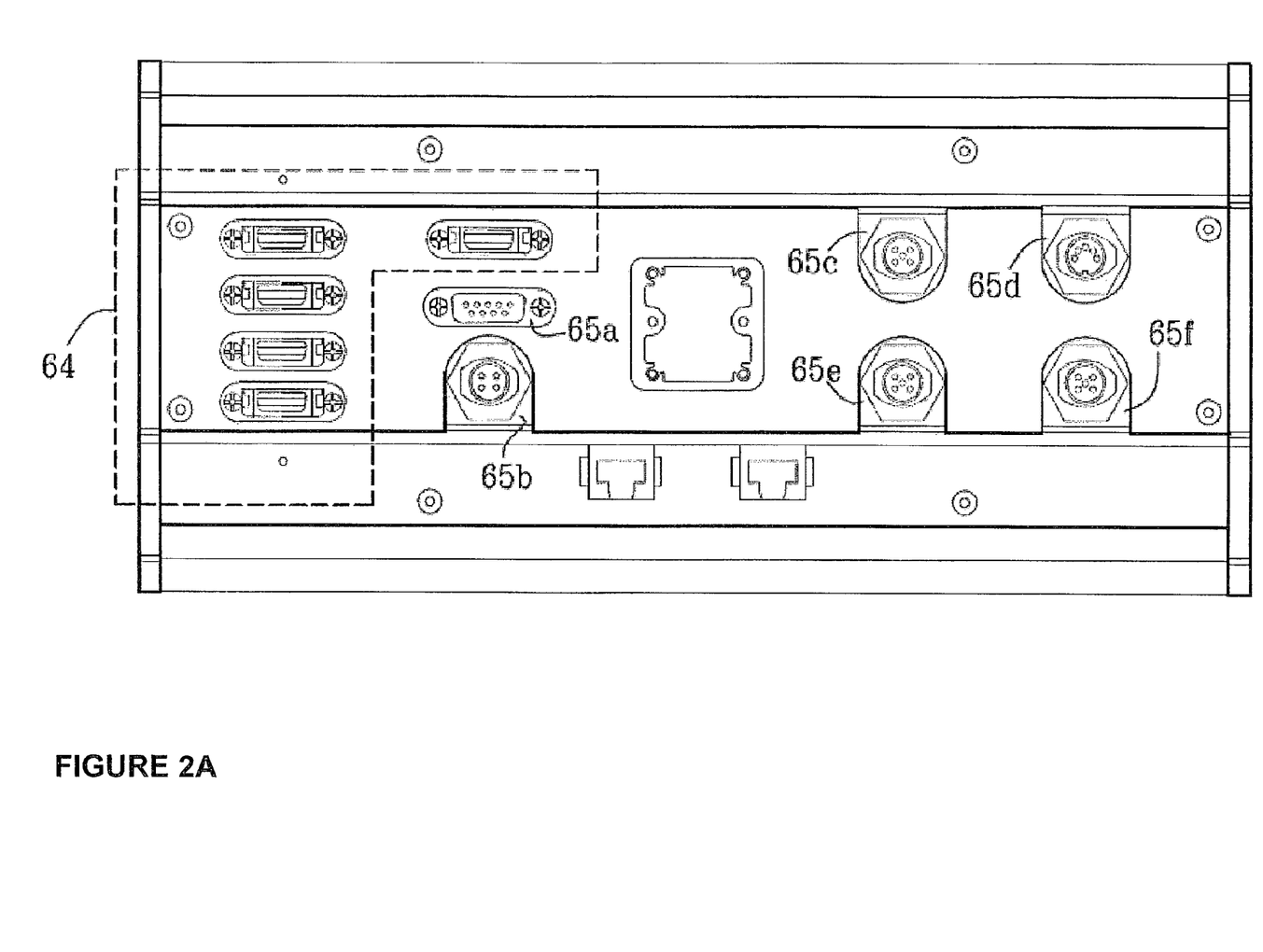
FIGS. 2A and 2B are schematic views of example multiple print-head connection ports of the controller of FIG. 1, according to some of the example embodiments.

FIG. 2A illustrates an example of a print-head connection port. The print-head connection port may feature any number of print-head connections. Any number of the print-head connections may be of a same type or shape, as illustrated by the print-head connection group 64. It should be appreciated that the print-head connectors of group 64 may be dedicated print-head connectors, which may be configured to connect with a print-head of a specific type. Thus, detection of the print-head type may be performed by determining which print-head connector is connected to a print-head.

Alternatively, the print-head connectors of group 64 may be configured to connect to any type of print-head, despite being of a same shape or type. Such print-head connectors may be referred to as universal print-head connectors. In such a configuration, print-head detection may be determined by information supplied by the print-head or by voltage analysis, which will be described in greater detail below. FIG. 2A further provides examples of print-head connectors 65a-65f of different types and shapes. It should be appreciated that any number of the print-head connectors 65a-65f may be dedicated or universal type print-head connectors.

Figure 2B:
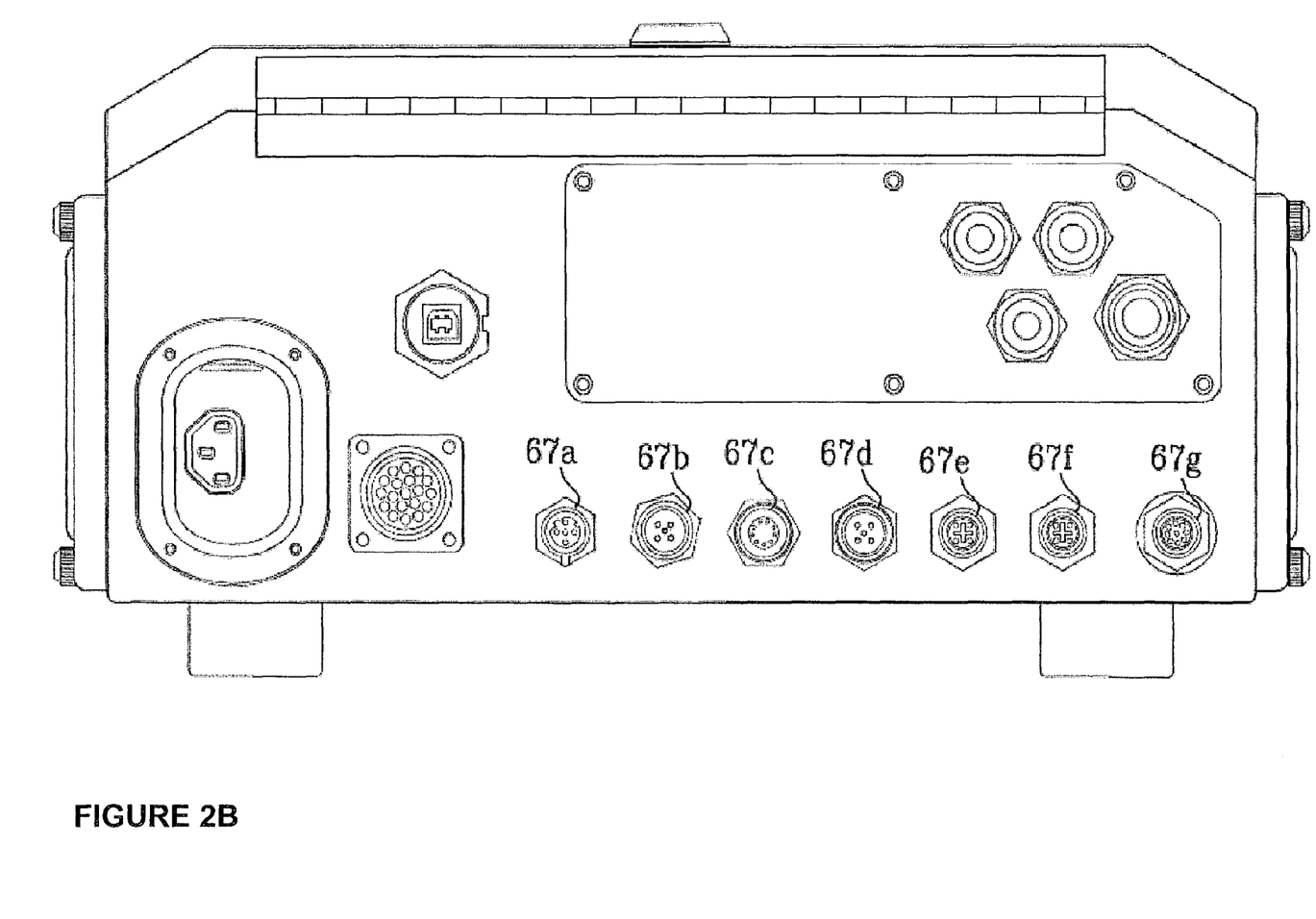

FIG. 2B provides an additional example of a print-head connection port. Any number of the print-head connectors 67a-67g may be dedicated or universal print-head connectors. It should be appreciated that the connection ports of FIGS. 2A and 2B are provided merely as examples. The connection ports may comprise any number of connectors suitable for connecting to any number of print-heads of different technologies, and may be of any dimension, shape or type.

Some of the various print technologies which may be used in conjunction with the controller 11 may be, but are not limited to, vector, raster, and/or Radio Frequency Identification (RFID) type print technologies. Specifically, these technology types may comprise laser, thermal transfer, direct thermal transfer, valve jet, continuous ink jet, bubble jet, and/or piezoelectric type printers. It should be appreciated that the example embodiments presented herein may be applied to any type of printing technology. It should also be appreciated that the identification of a printing technology may be referred to herein as a print-head type configuration.

Figure 3:
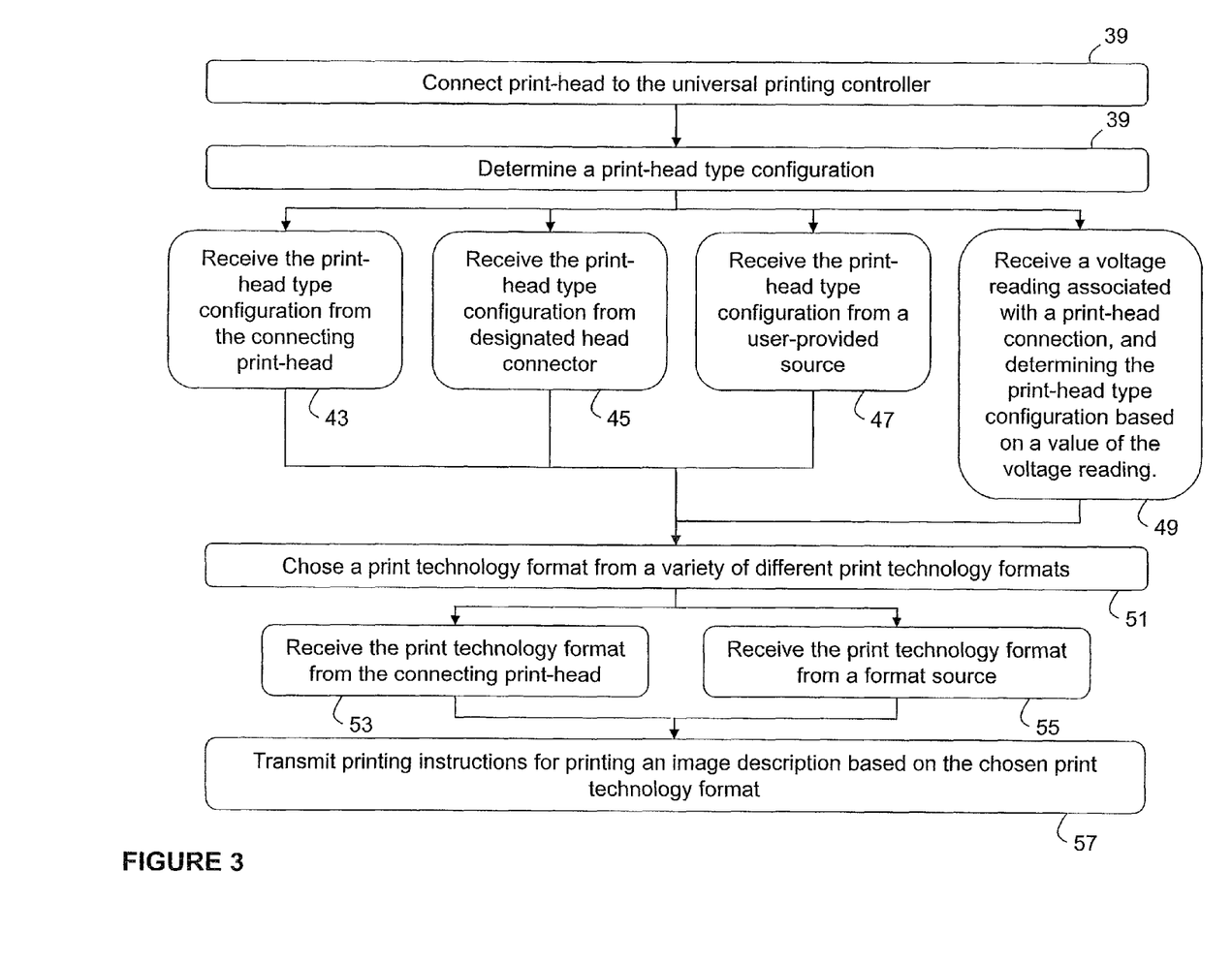
FIG. 3 is a flow diagram depicting example operations that may be taken by the universal printing controller of FIG. 1, according to some of the example embodiments.

FIG. 3 illustrates a flow diagram depicting example operations which may be taken by a universal printing controller, according to some of the example embodiments. During operation, a print-head is connected to the print-head connection port of the controller 11 (39). Once a connection has been detected, a print-head manager 35 is utilized in determining a print-head type configuration (41).

In some example embodiments, the print-head type configuration may be determined by receiving the print-head type configuration from the connecting print-head (43). For example, the print-head connector may comprise a readable memory where instructions and identification information may be stored. Thus, upon connection, the print-head connector may transmit print-head identification information through, for example, the communication ports 29.

In some example embodiments, the print-head type configuration may be determined by receiving the print-head type configuration from a designated head connector (45). As previously discussed, at least a subset of the various connection ports of the controller 11 may be designated ports. Thus, according to some example embodiments, a designated port may only be configurable to be connected to the print-head type associated with the designation. Therefore, upon detecting a connection to a designated port, the print-head manager 35 may determine the print-head type configuration of the connecting print-head.

In some example embodiments, the print-head type configuration may be determined by receiving the print-head type configuration from a user-provided source (47). For example, a user may provide the print-head type configuration via a user interface. In other example embodiments, the user may provide the print-head type configuration by uploading such information via a computer readable medium or a network server.

In some example embodiments, the print-head type configuration may be determined by receiving a voltage reading associated with a print-head connection. The print-head type configuration may thereafter be determined based on a value of the voltage reading (49). Different types of print technologies may require different amounts of power or voltage. Thus, by measuring the voltage associated with a connection print-head, the determination of the print-head type configuration may be made. It should be appreciated that the print-head manager 35 may retrieve a comparison voltage reading for the memory unit 31 or any other unit or database featuring stored information. It should further be appreciated that a user may program or enter respective voltage values for various print technologies in the controller 11. It should be appreciated that the methods for print-head type retrieval provided above are merely examples. Any other forms of print-head type retrieval known in the art may also be utilized. It should further be appreciated that multiple forms of print-head retrieval may be utilized at the same time to, for example, provide a check that the correct print-head type has been determined.

Once a determination of the print-head type configuration has been made, the print format unit 37 chooses a print technology format from a variety of different print technology formats (51). The different print technology formats may be associated with respective print technologies. Thus, knowledge of the print-head type configuration may be utilized in the selection of the print technology format.

Some examples of a print technology format may be, but are not limited to, imaging parameters and/or print technology-specific parameters. Examples of such comprise print resolution, bit depth, colour space, selection of rendering style, print compensation, print dispersion, crosstalk, overhearing, bleeding control, optics data, marking capabilities, and/or performance parameters or slanting parameters. It should be appreciated that the example embodiments presented herein may be applied to any type of print technology format known in the art.

In some example embodiments, the print technology format may be chosen by receiving the print technology format directly from the print-head connector (53). As was previously discussed, the print-head connector may comprise a readable memory where the print technology format may be stored and transmitted to the communication ports 29.

In some example embodiments, the print technology format may be chosen by receiving the print technology format from a format source (55). In some example embodiments, the format source may be a database stored within the controller 11 (e.g., the memory unit 31). Alternatively, the format source may be a data source accessible and/or downloadable from a network server. In some example embodiments, the format database or data source may be a print-head type-specific database or data source such that with knowledge of the print-head type, the specific database or data source which is desired may be accessed. In some example embodiments, the format source may be a user-provided source. For example, a user may provide the print technology format via a user interface. In other example embodiments, the user may provide the print technology format by uploading such information via a computer readable medium or a network server.

Once the print technology format has been chosen, the controller 11 transmits printing instructions for printing an image description based on the chosen format. The communication ports 29 may be utilized for transmitting the instructions to the connecting print-head.

It should be appreciated that all of the above operations may be performed simultaneously for different print-head technologies, thereby allowing a single controller to simultaneously provide printing control to various print technology types. Thus, a print data producer may be decoupled from the print technology-dependent consumer over a translation layer that is configurable at runtime to control the format of the output as well as properties like resolution and quality.

It should also be appreciated that utilizing the example embodiments allows for an increased separation between the different stages of data processing (e.g., escaped, expanded, filtered, encoded and rendered data processing stages). The separation of data processing allows for the ability to handle multiple formats of input and the generation of multiple formats of output with a common data processing engine.

The various embodiments have been described using an industrial printing environment as an example. It should be appreciated that any other printing environments may utilize the example embodiments as well. For example, modern office printers are today dealing with a related but different problem in that they can have multiple input formats that are desired to be printed using a single predefined printer technology. Examples here may be vector input from a Computer Aided Design (CAD) software package that is supposed to be printed on a bitmap printer. In such a case the input data may be prepossessed to generate an internal bitmap presentation of the provided data.

The above-mentioned and described embodiments are only given as examples and should not be limiting to the present invention. Other solutions, uses, objectives, and functions within the scope of the invention as claimed in the below described patent claims should be apparent for the person skilled in the art.

Modifications and other embodiments of the disclosed invention(s) will come to mind to one skilled in the art having the benefit of the teachings present in the foregoing descriptions and the associated drawings. Therefore, it is to be understood that the invention(s) is/are not to be limited to the specific embodiments disclosed and that modifications and other embodiments are intended to be comprised within the scope of this disclosure. Although specific terms may be employed herein, they are used in a generic and descriptive sense only and not for purpose of limitation.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The various embodiments of the present invention described herein are described in the general context of method steps or processes, which may be implemented in one embodiment by a computer program product, embodied in a computer-readable medium, including computer-executable instructions, such as program code, executed by computers in networked environments. A computer-readable medium may comprise removable and non-removable storage devices including, but not limited to, Read Only Memory (ROM), Random Access Memory (RAM), compact discs (CDs), digital versatile discs (DVDs), flash memory, EEPROM, etc. Generally, program modules may comprise routines, programs, objects, components, data structures, etc. that performs particular tasks or implement particular abstract data types. Computer-executable instructions, associated data structures, and program modules represent examples of program code for executing steps of the methods disclosed herein. Such instructions may be executed by the processing unit, e.g., central processing unit, microcontroller, microprocessor, field programmable gate array, application specific integrated circuit, digital signal processor, etc. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method for universal printing control comprising a single print controller for use in an industrial printing environment configured to control several types of print-heads, the method comprising:
receiving multiple print requests, a combination of the print requests including at least two different formats;
for each of multiple print-heads connected to the single print controller, determining a print-head type configuration from a variety of different print-head type configurations, wherein the determining of the print-head type configuration comprises:
receiving a voltage reading associated with a print-head connection; and
determining the print-head type configuration based on a value of the voltage reading;
for each of the received print requests:
choosing a print technology format from a variety of different print technology formats based on the print-head type configuration, wherein the variety of different print technology formats include at least two of laser, thermal transfer, direct thermal transfer, valve jet, continuous ink jet, bubble jet, or piezoelectric; and
translating the received print request to a print instruction based on the chosen print technology format;
transmitting simultaneously by the single print controller the print instructions to at least two of the connected print-heads.

2. The method of claim 1, wherein the choosing a print technology format further comprises receiving the print technology format from a connecting print-head.

3. The method of claim 1, wherein the choosing a print technology format further comprises retrieving the print technology format from a format source, the retrieve being based on the print-head type configuration.

4. The method of claim 3, wherein the format source is a format database.

5. The method of claim 4, wherein the format database is a specific database associated with a specific print-head type.

6. The method of claim 3, wherein the format source is a user-provided source.

7. The method of claim 1, wherein the variety of different print-head type configurations comprises at least one of a vector, raster, and/or RFID type of print technology.

8. The method of claim 1, wherein the print technology format comprises print imaging parameters and/or print technology specific parameters.

9. The method of claim 1, wherein the steps of determining, choosing, and transmitting occur simultaneously for different print-head types.

10. The method of claim 1, further comprising:
prior to transmitting the print instructions, generating the print instructions having a data format dependent upon the chosen print technology format.

11. A universal printing controller comprising:
a single print controller for use in an industrial printing environment configured to control one or several types of print-head and to receive multiple print requests, a combination of the print requests including at least two different formats;
a print-head manager configured to, for each of multiple print-heads connected to the single print controller, determine a print-head type configuration from a variety of different print-head type configurations;
a print format unit configured to, for each of the received print requests:
choose a print technology format from a variety of different print technology formats, wherein the variety of different print technology formats include at least two of laser, thermal transfer, direct thermal transfer, valve jet, continuous ink jet, bubble jet, or piezoelectric; and
translate the received print request to a print instruction based on the chosen print technology format; and
a communication port configured to transmit simultaneously printing instructions to at least two of the connected print-heads;
wherein the communication port is further configured to receive a voltage reading associated with a print-head connection; and
wherein the print-head manager is further configured to determine the print-head type configuration based on a value of the voltage reading received by the communication port.

12. The universal printing controller of claim 11 wherein the communication port is further configured to receive the print technology format from a connecting print-head and the print format unit is configured to choose the print technology format based on the received print technology format.

13. The universal printing controller of claim 11, wherein the print format unit is further configured to retrieve the print technology format from a format source based on the print-head type configuration, and the print format unit is further configured to choose the print technology format based on the retrieved print technology format.

14. The universal printing controller of claim 13, wherein the format source is a format database.

15. The universal printing controller of claim 14, wherein the format database is a specific database associated with a specific print-head type.

16. The universal printing controller of claim 13, wherein the format source is a user-provided source.

17. The universal printing controller of claim 11, wherein the variety of different print-head type configurations comprises at least one of a vector, raster, and/or RFID type of print technology.

18. The universal printing controller of claim 11 wherein the print technology format comprises print imaging parameters and/or print technology specific parameters.

19. The universal printing controller of claim 11, wherein the print-head manager, the print format unit and the communication port are configured to operate simultaneously for different print-head types.

20. The universal printing controller of claim 11, wherein the printing instructions having a data format dependent upon the chosen print technology format.

21. A non-transitory computer readable storage medium encoded with computer executable instructions, wherein the instructions, when executed by a universal printing controller comprising a single print controller for use in an industrial printing environment configured to control several types of print-head, perform a method comprising:
- receiving multiple print requests, a combination of the print requests including at least two different formats;
- for each of multiple print-heads connected to the single print controller, determining a print-head type configuration, from a variety of different print-head type configurations, wherein the determining of the print-head type configuration comprises:
  - receiving a voltage reading associated with a print-head connection; and
  - determining the print-head type configuration based on a value of the voltage reading;
- for each of the received print requests:
  - choosing a print technology format from a variety of different print technology formats based on the print-head type configuration, wherein the variety of different print technology formats include at least two of laser, thermal transfer, direct thermal transfer, valve jet, continuous ink jet, bubble jet, or piezoelectric; and
  - translating the received print request to a print instruction based on the chosen print technology format;
- transmitting simultaneously the print instructions to at least two of the connected print-heads.

22. The non-transitory computer readable storage medium of claim 21, further comprising:
- prior to transmitting the print instructions, generating the print instructions having a data format dependent upon the chosen print technology format.

* * * * *

UNITED STATES PATENT AND TRADEMARK OFFICE
CERTIFICATE OF CORRECTION

PATENT NO. : 9,443,177 B2  
APPLICATION NO. : 14/129566  
DATED : September 13, 2016  
INVENTOR(S) : Bjorn Bosell et al.

Page 1 of 1

It is certified that error appears in the above-identified patent and that said Letters Patent is hereby corrected as shown below:

On the Title Page

Item (73), where Assignee is listed as "MARKEM-IMAJE" Valence (FR), make correction to list Assignee as "MARKEM-IMAJE HOLDING" Valence (FR).

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*